(12) United States Patent
Fritskey et al.

(10) Patent No.: US 9,032,592 B2
(45) Date of Patent: May 19, 2015

(54) BAND CLAMP

(75) Inventors: John F. Fritskey, Strongsville, OH (US); Nicola A. Antonelli, Seven Hills, OH (US)

(73) Assignee: Voss Industries, Inc., Cleveland, OH (US)

( * ) Notice: Subject to any disclaimer, the term of this patent is extended or adjusted under 35 U.S.C. 154(b) by 289 days.

(21) Appl. No.: 12/755,108

(22) Filed: Apr. 6, 2010

(65) Prior Publication Data

US 2010/0257702 A1 Oct. 14, 2010

Related U.S. Application Data

(60) Provisional application No. 61/169,111, filed on Apr. 14, 2009.

(51) Int. Cl.
*B65D 63/06* (2006.01)
*B65D 63/00* (2006.01)
*F16L 33/04* (2006.01)

(52) U.S. Cl.
CPC ........................................ *F16L 33/04* (2013.01)

(58) Field of Classification Search
CPC ......... F16L 33/04; F16L 55/172; F16L 23/10; B23K 37/0533; A62C 13/78
USPC ............. 24/280, 274 R, 279, 274 P, 274 WB, 24/20 R, 282, 284, 286; 285/420, 23, 252, 285/253, 254, 245, 367, 410
See application file for complete search history.

(56) References Cited

U.S. PATENT DOCUMENTS

| 649,916 | A | * | 5/1900 | Dietrich | 24/279 |
| 748,009 | A | * | 12/1903 | Ramsey | 411/334 |
| 848,139 | A | * | 3/1907 | Stuppar | 138/99 |
| 973,466 | A | * | 10/1910 | Beegen | 285/322 |
| 1,387,258 | A | * | 8/1921 | Gunnett et al. | 411/334 |
| 1,635,783 | A | * | 7/1927 | Goodall | 24/284 |
| 1,641,559 | A | * | 9/1927 | Thompson | 24/279 |
| 2,403,606 | A | * | 7/1946 | Meyer | 24/276 |
| 2,677,164 | A | * | 5/1954 | Stade | 24/279 |
| 2,750,645 | A | * | 6/1956 | Seltzer | 24/279 |

(Continued)

FOREIGN PATENT DOCUMENTS

| DE | 33 26 070 A1 | 5/1984 |
| DE | 203 05 044 U1 | 5/2003 |

(Continued)

OTHER PUBLICATIONS

European Search Report of EP 10250759.7 dated Jul. 16, 2010.

*Primary Examiner* — Robert J Sandy
*Assistant Examiner* — Rowland Do
(74) *Attorney, Agent, or Firm* — Fay Sharpe LLP

(57) ABSTRACT

A band clamp includes an elongated band having a base portion which in cross section extends in a plane and first and second side portions. The first and second side portions of the band protrude away from the plane. A first housing is attached to the band and a second housing is attached to the band in a spaced manner from the first housing. A fastener is attached to one of the first and second housings in an adjustable manner. The fastener selectively engages with another of the first and second housings in a quick connect manner, such that the first and second housings can be brought closer to each other for tensioning the clamp around an associated object.

21 Claims, 7 Drawing Sheets

(56) References Cited

U.S. PATENT DOCUMENTS

| | | | | |
|---|---|---|---|---|
| 2,795,835 A * | 6/1957 | Hans et al. | | 24/280 |
| 2,837,383 A * | 6/1958 | Skelly | | 384/295 |
| 2,874,441 A * | 2/1959 | Duane | | 24/279 |
| 2,945,277 A * | 7/1960 | Wiora | | 24/281 |
| 2,955,340 A * | 10/1960 | Zartler | | 24/279 |
| 3,118,210 A * | 1/1964 | Schukraft | | 24/281 |
| 3,151,373 A * | 10/1964 | Whitcomb | | 24/279 |
| 3,303,669 A | 2/1967 | Oetiker | | |
| 3,537,147 A * | 11/1970 | Pfeuffer | | 24/20 TT |
| 3,750,241 A * | 8/1973 | Bootha | | 24/279 |
| 3,861,723 A * | 1/1975 | Kunz et al. | | 285/410 |
| 3,924,308 A * | 12/1975 | Duprez | | 24/274 R |
| 4,010,788 A * | 3/1977 | Van Gompel | | 411/334 |
| 4,024,609 A * | 5/1977 | Haynes | | 24/274 R |
| 4,049,298 A * | 9/1977 | Foti | | 285/148.26 |
| 4,310,956 A | 1/1982 | Meckstroth et al. | | |
| 4,312,101 A * | 1/1982 | Oetiker | | 24/20 R |
| 4,365,393 A * | 12/1982 | Hauffe et al. | | 24/279 |
| 4,381,020 A * | 4/1983 | Daghe et al. | | 138/99 |
| 4,473,928 A | 10/1984 | Johnson | | |
| 4,521,940 A * | 6/1985 | Oetiker | | 24/282 |
| 4,638,531 A * | 1/1987 | Ribrant | | 24/274 R |
| 4,667,375 A | 5/1987 | Enlund | | |
| 4,739,542 A * | 4/1988 | Krzesicki | | 24/285 |
| 4,782,577 A * | 11/1988 | Bahler | | 29/525.08 |
| 4,905,353 A * | 3/1990 | Gari | | 24/286 |
| 4,972,558 A | 11/1990 | Maio et al. | | |
| 5,329,673 A * | 7/1994 | Mason | | 24/279 |
| 5,454,606 A * | 10/1995 | Voss et al. | | 285/367 |
| 5,474,269 A | 12/1995 | Kasubke | | |
| 5,630,255 A | 5/1997 | Eliasson | | |
| 5,873,611 A * | 2/1999 | Munley et al. | | 285/367 |
| 6,000,104 A | 12/1999 | Mann | | |
| 6,088,886 A | 7/2000 | Gyöngyösi | | |
| 6,490,765 B2 * | 12/2002 | Anthes et al. | | 24/279 |
| 6,584,654 B1 | 7/2003 | Schaub | | |
| 6,866,301 B2 | 3/2005 | Brockway | | |
| 7,302,741 B2 | 12/2007 | Bowater | | |
| 7,389,568 B2 | 6/2008 | Crockett, IV et al. | | |
| 7,441,311 B2 | 10/2008 | Lovgren et al. | | |
| 8,245,361 B2 * | 8/2012 | Bouchiat et al. | | 24/279 |
| 8,454,056 B2 * | 6/2013 | Fernandes et al. | | 285/81 |
| 2005/0108859 A1 * | 5/2005 | Amendolea et al. | | 24/270 |
| 2005/0138778 A1 | 6/2005 | Oetiker et al. | | |
| 2008/0184536 A1 * | 8/2008 | Rigollet et al. | | 24/279 |
| 2010/0115733 A1 * | 5/2010 | Bouchiat et al. | | 24/19 |

FOREIGN PATENT DOCUMENTS

| | | | |
|---|---|---|---|
| WO | WO 2004/085904 | 10/2004 | |
| WO | WO 2006104439 A1 * | 10/2006 | F16L 33/04 |

* cited by examiner

BAND CLAMP

This application claims the benefit of Provisional Application Serial No. 61/169,111 which was filed on Apr. 14, 2009. The entire content of that application is incorporated hereinto by reference.

BACKGROUND

The present disclosure relates to band clamps. More particularly, it relates to an improved quick release band clamp which does not damage the conduit to which it is connected.

One widely used band clamp is known as a worm gear clamp. These clamps have numerous uses. One particular use is to attach a metal tube or plug to a conduit made of a resilient material, such as to a silicon rubber sleeve or tube.

One problem with known worm gear clamps is they do not seal uniformly around the circumference of the band. Another problem is that they cut and tear the tube material, due to the sharp edges of the band and the stamped slots through the band. Therefore, it has been desired to provide a clamp that can seal uniformly while protecting the conduit material to which it is secured from cuts and tears.

It is also known that a liner can be placed beneath the band of a worm gear clamp to prevent damage to the material of the conduit being clamped. However, this solution is disadvantageous since it requires a separate member, thereby increasing the cost of the clamp, adding weight and adding to assembly time as well.

Moreover known worm gear clamps do not have a quick disconnect feature, which makes them less desirable for that reason as well. A quick release feature would allow a clamp to be only partially untorqued for removal. This is not possible with worm gear clamps, and numerous other types of clamps. Therefore, it would be desirable to provide a band clamp which overcomes the foregoing difficulties and others and provides advantages not heretofore available.

BRIEF DESCRIPTION

A band clamp according to the present disclosure comprises an elongated band which includes a base portion that in cross section extends in a plane, a first side portion and a second side portion wherein the first and second side portions of the band protrude away from the plane of the base portion. A first housing is attached to the band. A second housing is attached to the band in a spaced manner from the first housing. A fastener is attached to one of the first and second housings in an adjustable manner. The fastener is selectively engageable with another of the first and second housings in a quick connect manner, such that the first and second housings can be brought closer to each other for tensioning the clamp around an associated object.

According to another embodiment of the present disclosure, there is provided a hose clamp. In accordance with this aspect of the disclosure, the hose clamp comprises an elongated metal band comprising in cross section a base portion extending in a plane and first and second side portions which protrude away from the plane. A first connecting element is mounted to the band in a spaced manner from a first end of the band. A second connecting element is located adjacent a second end of the band. A tensioning member is adjustably mounted to one of the first and second connecting elements and is selectively engageable with another of the first and second connecting elements for tensioning the clamp around an associated hose.

According to still another embodiment of the present disclosure, a quick release clamp is provided. In accordance with this aspect of the disclosure, the clamp comprises an elongated metal band comprising a first end, a second end and, in cross section, a base portion extending in a plane and first and second side portions which protrude away from said plane. A first housing is mounted to the band in a spaced manner from said first end and a second housing is mounted to the second end of said band. A nut is mounted to the first housing, and a fastener is adjustably mounted to said nut. The fastener is selectively engageable with the second housing for tensioning the clamp around an associated conduit.

DETAILED DESCRIPTION

Figure 1:
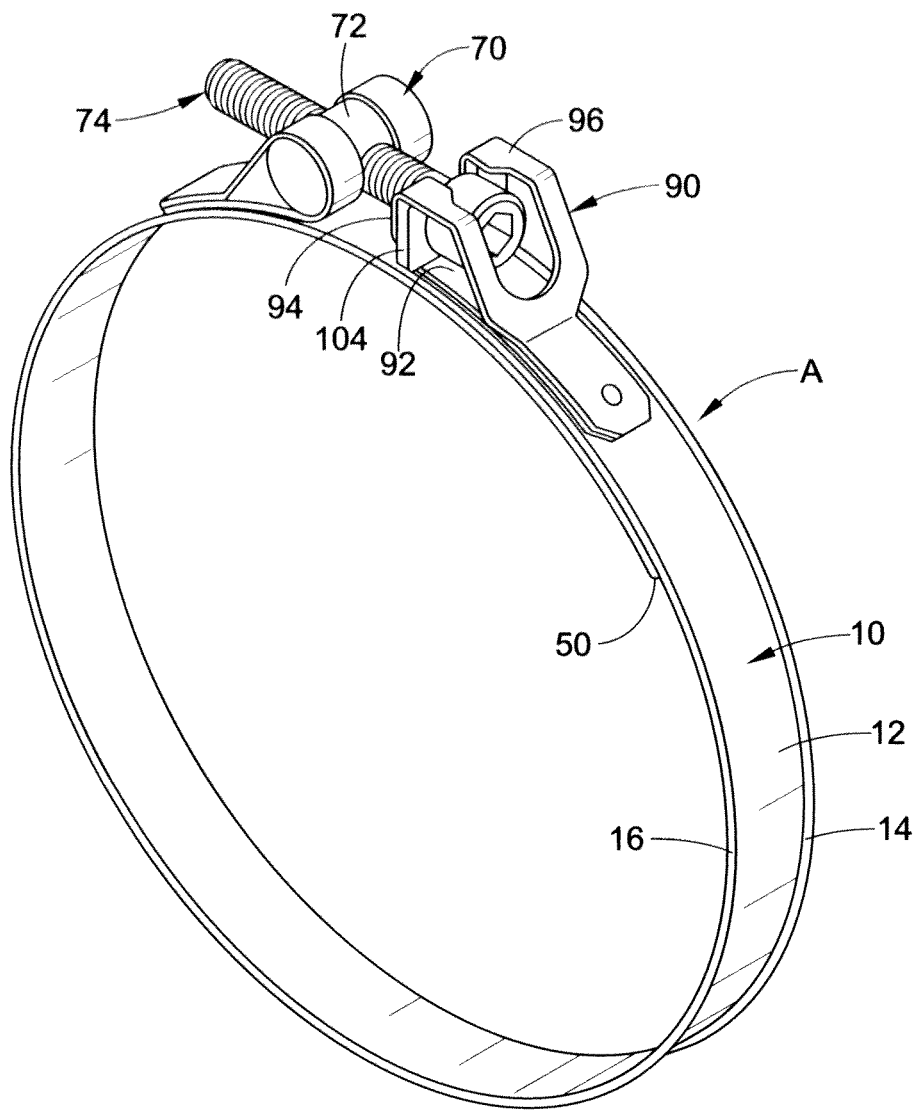
FIG. 1 is a perspective view of a first embodiment of a band clamp according to the present disclosure.

Referring now in greater detail to the drawings, wherein the showings are for purposes of illustrating preferred embodiments of the disclosure only and not for the purpose of limiting same. FIG. 1 illustrates a band clamp A according to one embodiment of the present disclosure. The clamp A includes a rolled edge band or liner 10. The liner is formed so that any sharp edge of the liner material will be directed away from the clamping surface. More particularly, the band 10 comprises a base portion or center portion 12 which takes the substantial width of the band. Located outwardly therefrom are first and second side edges, portions or border regions 14 and 16. The reason for sometimes terming the band 10 a liner is because many in the industry consider a band to be flat and a liner to have a rolled edge. Because the side edges or portions of the band 10 are displaced from the plane of the center portion of the band, it can also be termed a liner.

The band can vary in width, such as, for example, from one quarter inch to three quarters inch (0.635 cm to 1.91 cm) or more. The amount by which the two side edges or portions 14 and 16 of the band project out of the plane of the band base portion or center portion 12 can be at least the thickness of the band material. That can be about 0.187 inches (0.475 cm), and, more generally, can range between 0.1-1 inch (0.254 to 2.54 cm). The angle of protrusion of the two side portions can be on the order of 37.5 degrees or, more generally, can range between 30-45 degrees. The band can be made of any known aerospace material, such as stainless steel, titanium or, perhaps, carbon fiber reinforced composites. The width of the edge portions or border regions 14 and 16 can be small in comparison to the width of the central portion 12. Preferably, the edges or side portions 14 and 16 are deburred and polished.

Figure 2A:
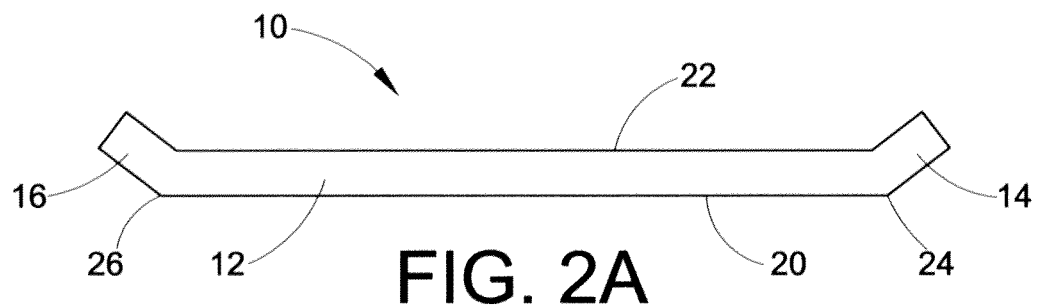
FIG. 2A is an enlarged schematic sectional view through a portion of a band or liner of the band clamp of FIG. 1.
Figure 2B:
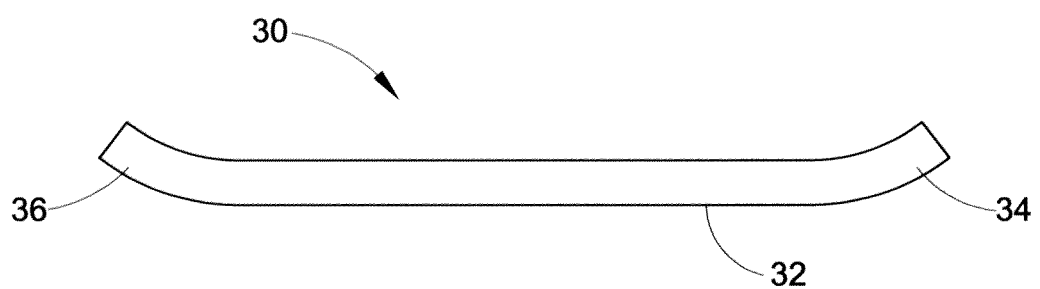
FIG. 2B is a schematic sectional view through a band according to another embodiment of the present disclosure.

With reference to FIG. 2A, the band or liner 10 includes an inner face 20 which contacts the material to be clamped and an outer face 22. Located at the intersections of the base portion 12 with the first and second side edges or portions 14 and 16 are respective corners 24 and 26. With reference now to FIG. 2B, another embodiment of a band or liner 30 is there disclosed. In this embodiment, the band or liner comprises a base portion 32 and first and second side edges or portions 34 and 36. However, unlike the embodiment of FIG. 2A, the side edges or portions are not sharply angled in relation to the base portion. They are, instead, rounded. Thus, no defined corners are evident on the inner face of the band 30 in the embodiment of FIG. 2B.

Figure 3:
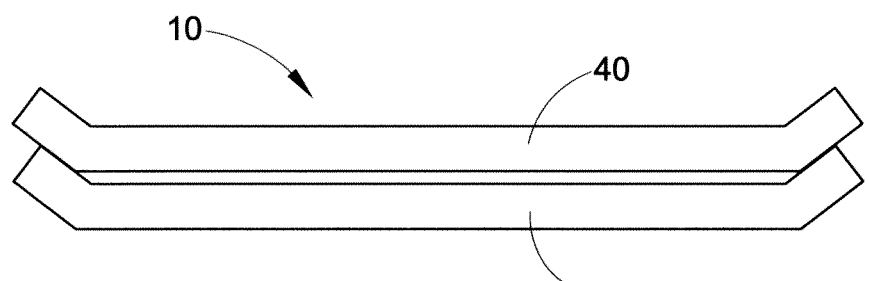
FIG. 3 is an enlarged schematic sectional view showing two portions of the band of FIG. 1 interlocking with each other when the band is coiled greater than 360 degrees.

The liner or band 10 is rolled greater than 360 degrees as can be seen in FIG. 1. With reference now to FIG. 3, it is evident that, when so rolled, the first and second sections 40 and 42 of the band or liner 10 can overlap. When this occurs, the two side edges or portions contact each other. The side edges or portions of the second section 42 are slightly flared out during the tightening of the clamp, so that the liner sections interlock with each other. This aids in forming a sealing feature which is believed to be unique to the design of the clamp of the present disclosure. The edges 14 and 16 of the rolled liner 10 which make contact with the mating or to be clamped part B (see FIG. 5) are polished so that no sharp edge may contact and possibly cause damage to the flexible material of the conduit meant to be clamped.

Figure 4A:
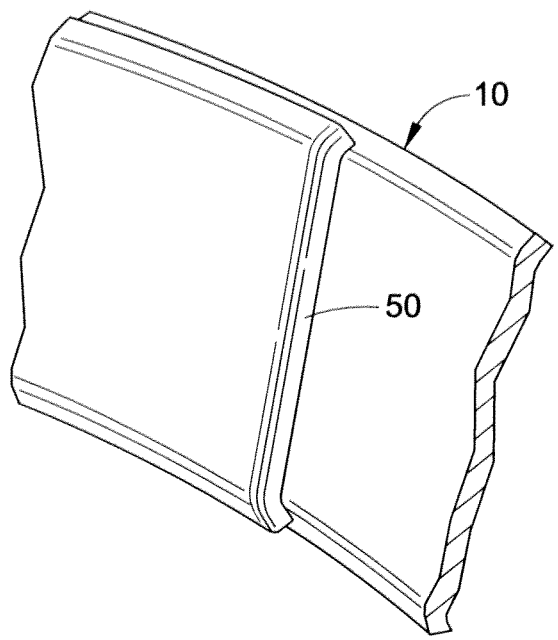
FIG. 4A is an enlarged perspective view from inside a coil of the band, and partially in section, showing an end of the band of FIG. 1 cooperating with another portion of the band.

With reference now to FIG. 4A, a first end face or free end 50 of the liner or band 10 is illustrated as being smooth, deburred and polished. This is quite desirable so as to reduce the tendency of the clamp assembly A to cut or tear the material of the conduit which is being clamped. In fact, the entire inner surface or face 20 can be polished, or at least the under lap portion thereof (see FIG. 6) as this portion will be forced into intimate contact with the conduit material. It also greatly increases the sealing performance of the clamp in relation to conventional worm gear clamps. A second end face 52 of the liner or band can be seen in FIG. 6. As mentioned, the clamp A is particularly desirable when clamping a flexible material, such as a resilient sleeve, e.g., a silicon sleeve, to a metal tube. However, the clamp A can also be employed for clamping one metal tube to another metal tube.

Figure 4B:
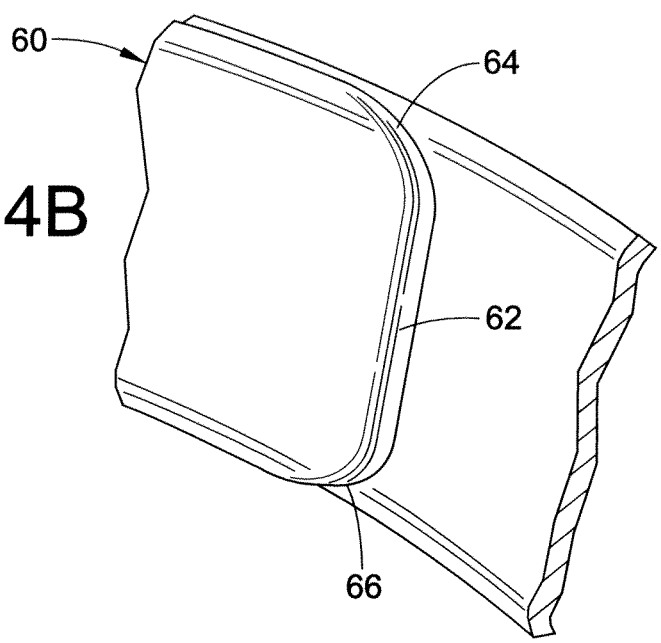
FIG. 4B is a perspective view, partially in section, of an end portion of a band from inside a coil of the band, according to another embodiment of the present disclosure, showing the end portion cooperating with another portion of the band.

With reference now to FIG. 4B, in accordance with another embodiment of the present disclosure, a band 60 includes a first end 62 which is provided with rounded corners 64 and 66, or is chamfered, in order to reduce the possibility that any sharp corner or the free end of the band will damage the material of the conduit which is being clamped.

With reference again to FIG. 1, a formed first housing or loop 70 is connected to the band in a spaced manner from the first end 50 of the band. The loop 70 houses a solid barrel locking nut 72. The barrel locking nut is held in the loop, and the loop 70 can be attached to the rolled edge liner or band 10 by means of spot welding, although other attachment means and options may be used. As is conventional, a threaded bore (not visible) extends through the locking nut 72. The locking nut can be cylindrical or barrel shaped. This shape allows it to rotate in the first housing as needed when the band is tightened or loosened. To this end, the housing or loop 70 can define a rounded or barrel shaped opening to accommodate the locking nut 72. As noted, the housing or loop 70 is secured to the liner or band 10 at a location spaced from the first end 50 of the band. This relationship allows the liner or band 10 to be looped to a greater than 360 degree configuration.

Figure 5A:
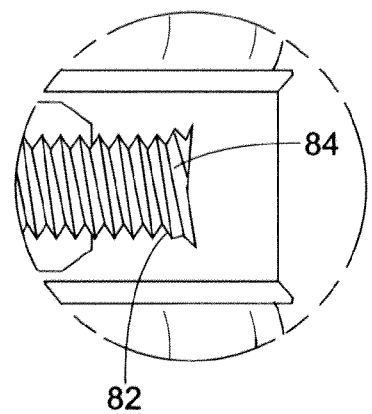
FIG. 5A is an enlarged top plan view of an end portion of a fastener of the clamp illustrated in FIG. 5.
Figure 5:
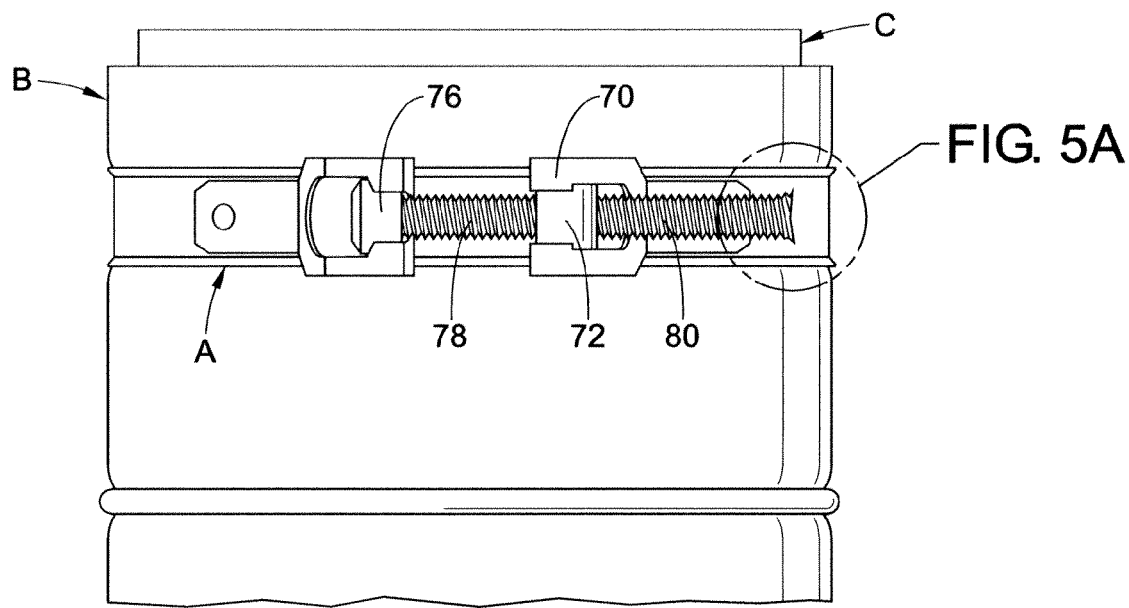
FIG. 5 is a top plan view of the clamp of FIG. 1, in a reversed orientation, in use and fastening a flexible material sleeve to a tubular member.

Cooperating with the locking nut 72 is a fastener 74. With reference now also to FIG. 5, in one embodiment, the fastener comprises a screw having a head 76 and a stem 78 which is provided with threading 80 that cooperates with the threaded bore of the nut. It should be appreciated that the bore threading is such as to enable the stem 78 to lock in a desired position in the nut. With reference now to FIG. 5A, it can be seen that a distal end 82 of the stem can be upset, as at 84, in order to prevent the fastener from being completely detached from the locking nut 72. As is evident from FIG. 5, the band clamp A is mounted on a sleeve B in order to secure the sleeve to an underlying conduit C.

An integral quick release feature is incorporated in the disclosed band clamp A and includes an opposite or second loop or housing 90. More particularly, with reference now also to FIG. 6, the loop includes a first portion 92 which parallels the orientation of the band or liner 10, a second portion 94 which is generally transverse thereto (see also FIG. 1), a third portion 96 which is somewhat parallel to the first portion 92, a fourth portion 98 which is somewhat parallel to the second portion 94, and a fifth portion 100 which is generally parallel to the first portion 92. As is evident from FIGS. 1 and 6, a generally box shaped housing with a tail is thus formed.

Mounted inside the loop or housing 90, and adjacent the second portion 94, is an insert or stiffening element or member 104. This serves to strengthen the housing 90 when it is contacted by the head 76 of the fastener 74. The insert reduces the possibility that the housing second portion 94 would become distorted (plastically deform) upon a tightening of the fastener 74, during the drawing of the two housings 70 and 90 towards each other.

Figure 6:
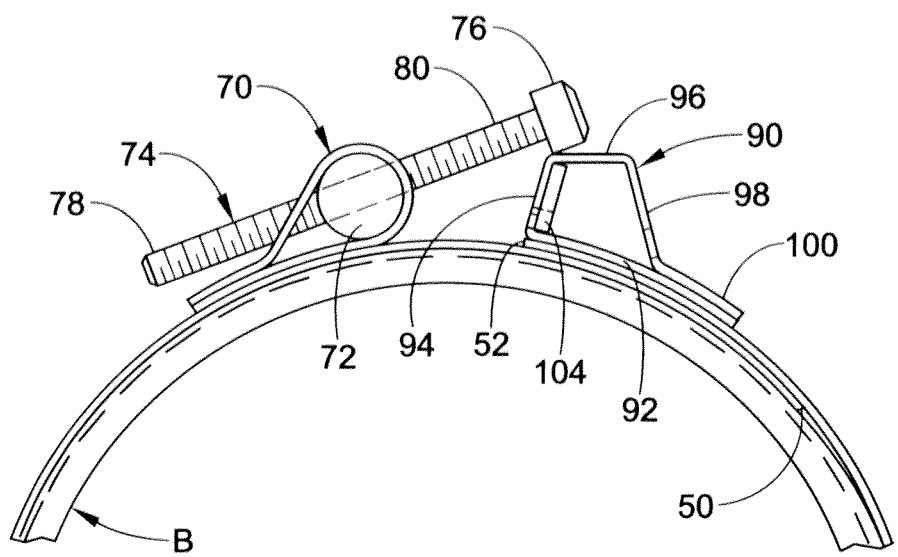
FIG. 6 is an enlarged side elevational view of a portion of the band clamp of FIG. 1 mounted on a tube and in an unclamped position.
Figure 6A:
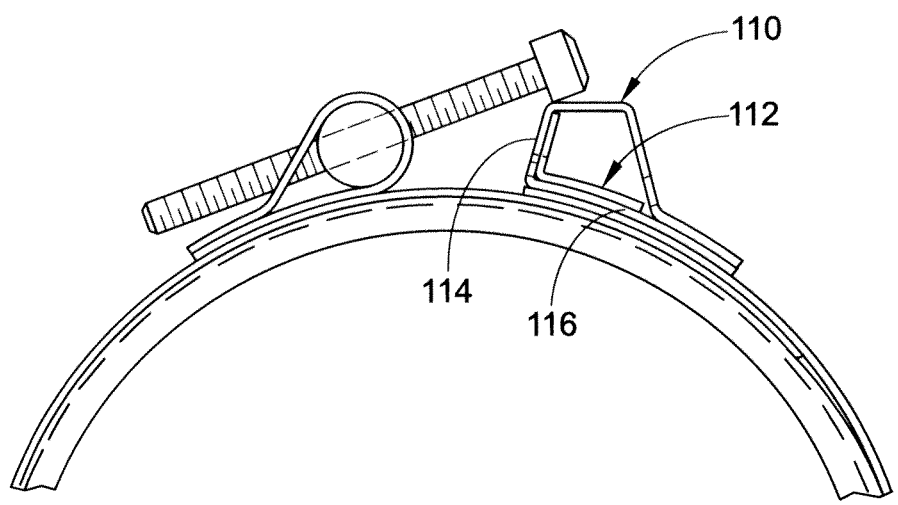
FIG. 6A is an enlarged side elevational view of a band clamp according to another embodiment of the present disclosure, mounted on a tube and shown in an unclamped position.

With reference now to FIG. 6A, another embodiment of a band clamp according to the present disclosure includes a second loop or housing 110. This includes an L-shaped stiffening member 112 which extends along two generally transverse faces 114 and 116 of the loop 110. The reinforcing member or stiffening member 104 or 112 can be attached to the quick release loop 90 or 110 by means of spot welding or the like. Other options of attachment may, however, also be used.

The quick release feature also includes aligned slots in the second housing, as will be described below. The loop assembly 90 or 110 can be attached to the rolled edge liner by means of spot welding. Of course, other options for attaching may also be used. It should be apparent from FIGS. 1 and 6 that the housing or loop 90 is secured to the band 10 at the second end 52 thereof.

The raised side portions of the disclosed band can also be advantageous as they can serve to increase the stiffness of the band. Moreover, the raised side portions also serve to guide the band ends during a tightening of the band, so that the opposed ends of the band do not splay outwardly away from each other. In other words, the ends of the band are guided during the tightening of the band so that they remain aligned.

In one embodiment, either a silver plated or a non-silver plated socket head cap screw 74 is threaded into the self locking barrel nut 72. Other types of fasteners including torx head, hex head and Phillips head may also be used as an alternate to the socket head cap screw. The fastener or screw 74 once installed into the barrel self locking nut 72 can have the end thread at the point of the bolt deformed mechanically as at 84, as mentioned. Doing so creates an encapsulating feature whereby the screw 74 cannot become loose from clamp assembly A. One advantage of employing a silver plated cap screw 74 is that the screw can be threaded in relation to the barrel locking nut 72, a great number of times without damage to the threading either on the screw or in the nut. The silver plate coating provides lubricity against galling which allows for multi use installations. It is estimated that at least 50 installations and perhaps hundreds are thus possible.

Figure 7:
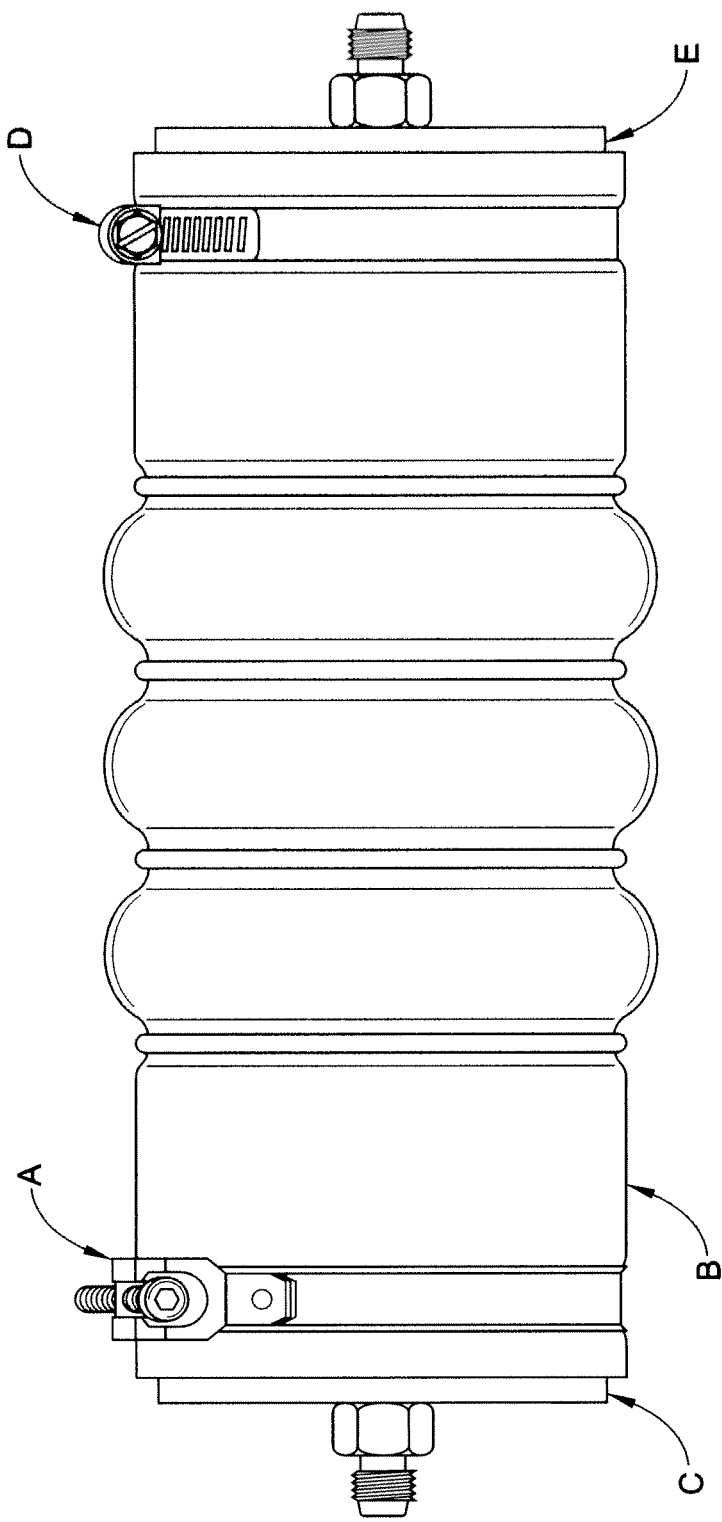
FIG. 7 is a top plan view illustrating a band clamp according to the present disclosure and a conventional worm gear clamp, both being mounted to a sleeve of a flexible material, which sleeve is connected to respective tubular conduits on each end.
Figure 8:
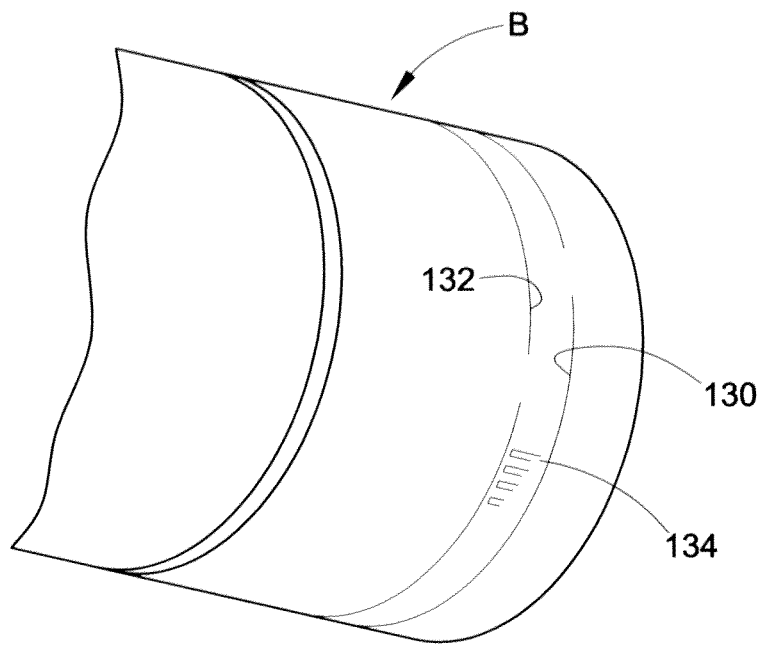
FIG. 8 is a perspective view of a sleeve after detachment of the conventional worm gear clamp of FIG. 7, showing the marks made on the sleeve by the conventional clamp; and, FIG. 9 is an enlarged partial cross sectional view of a portion of a band clamp according to yet another embodiment of the present disclosure.

With reference now to FIG. 7, illustrated on a left side thereof is the band clamp A according to one embodiment of the present disclosure, as employed for securing the sleeve B, which can be of a flexible material to the conduit C, which can be a metal tube. Located on the right side of FIG. 7, a conventional worm gear clamp D is shown as securing the sleeve B to another metal tube E. When the worm gear clamp D is removed, damage will be visible to the material of the sleeve B, as is evident from FIG. 8. More particularly, indentations 130 and 132 and, perhaps, cuts or slits are formed in the material of the sleeve B by the opposed edges of the band of a conventional worm gear clamp. This damage to the sleeve material occurs because the entire width of the band lies in a single plane. In addition, indentations or cuts 134 are evident on the sleeve B. Such indentations are visible at the locations where the slots in the band of the worm gear clamp contact the sleeve B.

Figure 9:
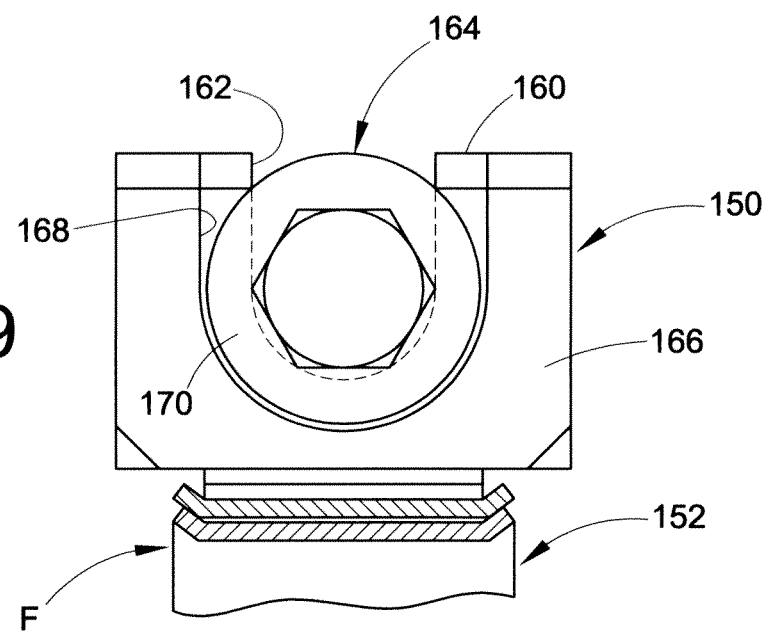

With reference now to FIG. 9, illustrated therein is an embodiment of a band clamp F in which a second loop or housing 150 is wider than is a width of a liner or band 152. Also evident in FIG. 9 is the quick release feature that is also shown in FIGS. 1, 6 and 6A. More particularly, a second portion 160 of the second loop or housing 150 has a slot 162 defined therein, which slot can accommodate a stem (not visible) of a fastener 164. An associated reinforcing member (such as 104 in FIG. 6 or 112 in FIG. 6A) has an aligned slot therein. A fourth portion 166 of the second loop 150 also has a slot 168 defined therein. The slot 168 is of a larger diameter than the slot 162 so as to accommodate a head 170 of the fastener 164. Thus, the underside of the head is held by the walls of the second portion 160, as well as an aligned portion of any reinforcing member secured thereto, but the head can be pulled away from the housing, since it clears the slot 168. The quick release feature disclosed herein can be appreciated from a comparison of FIGS. 1 and 9 on the one hand and 6 and 6A on the other hand.

The clamp can be made in sizes ranging from, for example, 1.50 inches in diameter to 10.00 inches in diameter (3.81 cm to 25.4 cm). The clamp can be offered in increments of 0.125 inches (0.3175 cm), if so desired. The fastener can be about 1-1.50 inches (2.54 cm to 3.81 cm) in length, if so desired. The preselected size clamp may be assembled and torqued onto a flexible material conduit mounted on a metal end flange (FIG. 7), as an example. It may be removed without the need of entirely untorqueing and removing the socket head cap screw 74 (FIGS. 6 and 6A). In one embodiment, the adjustment range of the clamp can be on the order of 0.25 inches (0.635 cm) or more.

The present disclosure describes a band clamp with a rolled edge liner which interlocks greater than 360 degrees. It has two individual loops or housings which make up the latch system. One loop has an integral quick release feature whereby the hardware need not be totally disassembled to remove the clamp. The opposite loop houses a barrel locking nut. Either A silver plated or non-silver plated socket head screw or bolt can provide the available diametrical adjustment range necessary, as it is threaded into and out of the locking barrel nut. The device of the present disclosure by virtue of its 360 degree rolled edge liner and durable quick release and self locking latch mechanism provides a clamp which does not harm the sleeve material it clamps onto, yet provides an almost perfect seal in low pressure applications (i.e. up to 20 PSI).

The torque and sealing performance of the disclosed clamp is not lost during thermal cycling, such as that which takes place in aerospace applications of the disclosed clamp, for example, at an air intake on an intercooler. The clamp disclosed herein also fully encapsulates its connect-disconnect or latching hardware so as to reduce the possibility of foreign object damage during use.

A band clamp with both a quick release and self locking features has been disclosed. A rolled edge liner of the clamp offers 360 degrees of uniform sealing that is superior in comparison to the known clamps, without damage to the mating surface that it clamps against.

Obviously, modifications and alterations will occur to others upon reading and understanding the preceding detailed description. It is intended that the disclosed embodiments be construed as including all such modifications and alterations, insofar as they come within the scope of the appended claims or the equivalents thereof.

The invention claimed is:
1. A band clamp comprising:
an elongated band comprising a base portion which in cross-section extends in a plane, a first side portion and a second side portion, wherein said first and second side portions of said band protrude away from said plane;
a first housing attached to said band;
a second housing attached to said band in a spaced manner from said first housing, wherein said second housing includes a plurality of planar sections that are angled in relation to each other and together form a generally box-shaped housing; and
a fastener comprising a head portion and a shaft, the fastener attached to one of said first and second housings in a longitudinally adjustable manner and selectively engageable with another of said first and second housings in a quick connect manner, via slots defined in at least two of said plurality of planar sections, such that said first and second housings can be brought closer to each other for tensioning the clamp around an associated object wherein said fastener includes a portion to prevent said fastener from being disengaged from said one of said first and second housings wherein a slot defined in one of the at least two of said plurality of planar sections includes a first section of a first width and a second section of a second width which is larger than the first width, wherein the second section accommodates the head portion of the fastener.

2. The clamp of claim 1 wherein said first housing includes a locking nut and wherein said fastener comprises a screw which cooperates with said nut.

3. The clamp of claim 2 wherein said screw shaft includes a threaded portion which engages said locking nut.

4. The clamp of claim 1 further comprising a reinforcing member mounted to at least one of said plurality of planar sections of said second housing.

5. The clamp of claim 1 wherein sections of said band are adapted to nest so that an underlying section is flared open by and in relation to an overlying section of said band.

6. The clamp of claim 1 wherein at least one of said band first and second ends is deburred for better mating contact with another portion of said band.

7. The clamp of claim 1 wherein said first and second side portions both protrude away from said plane in the same direction.

8. The clamp of claim 1 wherein said first and second side portions protrude at least a distance which corresponds to a thickness of said base portion.

9. A hose clamp comprising:
an elongated metal band comprising in cross section a base portion extending in a plane and first and second side portions which protrude away from said plane wherein the side portions extend along said elongated metal band from a first end thereof to a second end thereof;
a first connecting element mounted to said band;
a second connecting element mounted to said band in a spaced manner from the first connecting element, wherein said second connecting element comprises a generally box-shaped housing including a plurality of planar sections that form walls of the housing; and
a tensioning member adjustably mounted to said first connecting element and selectively engageable with said second connecting element for tensioning the clamp around an associated hose wherein said tensioning member includes a stem comprising a threaded section including an upset distal end in order to prevent the tensioning member from being completely detached from said first connecting element and a proximal end terminating in a head wherein the head and the second connecting element are so configured that said head is adapted to be selectively detachable from and connectable to said second connecting element while the stem remains connected to the first connecting element.

10. The clamp of claim 9 wherein said tensioning member comprises a screw.

11. The clamp of claim 10 wherein said first connecting element includes a locking nut and wherein said screw includes a threaded shaft which engages said locking nut.

12. The clamp of claim 9 wherein said housing includes a reinforcing member.

13. The clamp of claim 9 wherein at least one of said band first and second ends is deburred for better mating contact with another portion of said band.

14. The clamp of claim 9 wherein said first and second side portions both protrude in the same direction.

15. The clamp of claim 9 wherein said first and second side portions protrude at least a distance which corresponds to a thickness of said base portion.

16. A quick release clamp comprising:
an elongated metal band comprising a first end, a second end and, in cross section, a base portion extending in a plane and first and second side portions which protrude away from said plane;
a first housing mounted to said band in a spaced manner from said first end;
a second housing mounted to the second end of said band wherein said second housing comprises a plurality of planar sections which together form a box-shaped construction and a reinforcing member attached to one of said plurality of planar sections;
a nut mounted to said first housing; and
a fastener adjustably mounted to said nut and selectively engageable with and disengageable from said second housing in a quick connect manner, via slots defined in at least two of said plurality of planar sections wherein the slots defined in said at least two of said plurality of planar sections are oriented generally normal to each other, for tensioning the clamp around an associated conduit.

17. The clamp of claim 16 wherein said first and second side portions protrude at least a distance which corresponds to a thickness of said base portion.

18. The clamp of claim 16 wherein said fastener comprises a stem with a portion which prevents the fastener from being disengaged from said nut.

19. The clamp of claim 16 wherein the reinforcing member is planar.

20. The clamp of claim 16 wherein said slots are aligned.

21. The clamp of claim 16 wherein said first and second side portions protrude away from said plane in the same direction.

* * * * *